US012320170B2

(12) United States Patent
Ernst

(10) Patent No.: US 12,320,170 B2
(45) Date of Patent: Jun. 3, 2025

(54) DOUBLE-LEAF VEHICLE DOOR DEVICE WITH PRE-LOCKING FUNCTION FOR THE LEADING DOOR LEAF

(71) Applicant: KNORR-BREMSE GESELLSCHAFT MIT BESCHRÄNKTER HAFTUNG, Mödling (AT)

(72) Inventor: Michael Ernst, Hilm (AT)

(73) Assignee: KNORR-BREMSE GESELLSCHAFT MIT BESCHRÄNKTER HAFTUNG (AT)

( * ) Notice: Subject to any disclaimer, the term of this patent is extended or adjusted under 35 U.S.C. 154(b) by 453 days.

(21) Appl. No.: 17/762,357

(22) PCT Filed: Aug. 26, 2020

(86) PCT No.: PCT/EP2020/073804

§ 371 (c)(1),
(2) Date: Mar. 21, 2022

(87) PCT Pub. No.: WO2021/052726

PCT Pub. Date: Mar. 25, 2021

(65) Prior Publication Data

US 2022/0341227 A1 Oct. 27, 2022

(30) Foreign Application Priority Data

Sep. 20, 2019 (EP) .................................... 19198508

(51) Int. Cl.
*E05B 85/26* (2014.01)
*B61D 19/00* (2006.01)
(Continued)

(52) U.S. Cl.
CPC ............ *E05B 85/26* (2013.01); *B61D 19/005* (2013.01); *B61D 19/02* (2013.01); *E05B 77/46* (2013.01);
(Continued)

(58) Field of Classification Search
CPC ........ E05B 85/24; E05B 85/245; E05B 85/26; E05B 77/46; E05B 81/14; E05B 81/64;
(Continued)

(56) References Cited

U.S. PATENT DOCUMENTS 5,688,004 A * 11/1997 Karge .................... E05B 83/12 292/201
6,688,042 B2 * 2/2004 Stojc .................. E05B 47/0012 49/118

(Continued)

FOREIGN PATENT DOCUMENTS

EP 1254820 A2 11/2002
EP 1953317 A2 8/2008
WO 2008056620 A1 5/2008

*Primary Examiner* — Kristina R Fulton
*Assistant Examiner* — Noah Horowitz
(74) *Attorney, Agent, or Firm* — Barnes & Thornburg LLP

(57) ABSTRACT

The invention relates to a double-leaf vehicle door device comprising at least the following: two door leaves, each of which can be moved between an open position and a closed position in the form of a respective end position and into any intermediate position between the first open position and the first closed position, wherein a first movement of the first door leaf between the first open position and the first closed position is carried out without mechanically coupling the first door leaf to the second door leaf in contrast to a second movement of the second door leaf between the second open position and the second closed position, and a common locking device is provided which locks the first door leaf in the closed position when the first door leaf is located in the closed position and which locks the second door leaf in the closed position when the second door leaf is in the closed position. A pre-locking function is provided such that of the first door and the second door leaf, the door leaf which first reaches the closed position is held in the closed position at (Continued)

least until the other door leaf has also reached the closed position, and the locking device is additionally designed to only then lock or become capable of locking the first door leaf and the second door leaf.

20 Claims, 7 Drawing Sheets

(51) Int. Cl.

| | |
|---|---|
| ***B61D 19/02*** | (2006.01) |
| ***E05B 77/46*** | (2014.01) |
| ***E05B 81/14*** | (2014.01) |
| ***E05B 81/68*** | (2014.01) |
| ***E05B 81/70*** | (2014.01) |
| ***E05B 81/72*** | (2014.01) |
| ***E05B 83/36*** | (2014.01) |
| ***E05B 83/40*** | (2014.01) |
| ***E05B 85/24*** | (2014.01) |

(52) U.S. Cl.
CPC .............. *E05B 81/14* (2013.01); *E05B 81/68* (2013.01); *E05B 81/70* (2013.01); *E05B 81/72* (2013.01); *E05B 83/363* (2013.01); *E05B 83/40* (2013.01); *E05B 85/245* (2013.01)

(58) Field of Classification Search
CPC .......... E05B 81/68; E05B 81/70; E05B 83/02; E05B 83/04; E05B 83/06; E05B 83/14; E05B 83/363; E05B 83/38; E05B 83/40
See application file for complete search history.

(56) References Cited

U.S. PATENT DOCUMENTS

| | | | | |
|---|---|---|---|---|
| 6,708,449 | B2 * | 3/2004 | Stojc | E05F 15/635 49/362 |
| 8,978,301 | B2 * | 3/2015 | Ueda | E05B 81/13 292/201 |
| 9,316,030 | B2 * | 4/2016 | Takahashi | B60J 5/06 |
| 9,745,773 | B2 * | 8/2017 | Halliwell | E05B 83/20 |
| 9,759,004 | B2 * | 9/2017 | Uno | E05F 15/632 |
| 10,337,227 | B2 * | 7/2019 | Stoof | E05D 3/127 |
| 10,449,976 | B2 * | 10/2019 | Yamaguchi | E05C 7/045 |
| 2009/0230699 | A1 * | 9/2009 | Carabalona | B60R 7/06 292/48 |

* cited by examiner

DOUBLE-LEAF VEHICLE DOOR DEVICE WITH PRE-LOCKING FUNCTION FOR THE LEADING DOOR LEAF

CROSS REFERENCE AND PRIORITY CLAIM

This patent application is a U.S. National Phase of International Patent Application No. PCT/EP2020/073804 filed Aug. 26, 2020, which claims priority to European Patent Application No. 19198508.4, the disclosure of which being incorporated herein by reference in their entireties.

FIELD

Disclosed embodiments concern a double-leaf vehicle door device as well as a vehicle, in particular a rail vehicle, with at least one such double-leaf vehicle door device.

BACKGROUND

Generating or not generating the door leaf locking signal may have the consequence that a vehicle, in particular a rail vehicle intended for mass transport, is (e.g., automatically) permitted to start or continue travel from a halt, stoppage or shutdown of the vehicle, in particular the rail vehicle, only after generation or in the presence of a door leaf locking signal; whereas in the absence of the door leaf locking signal, the start or continuation of travel of the vehicle, in particular the rail vehicle, is (e.g., automatically) not permitted or is prevented. This avoids the vehicle starting or continuing travel when the door leaves 5*a*, 5*b* are not or not reliably locked, which is relevant for safety above all in public mass transport.

For example, in particular in the case of a vehicle intended for mass transport and approaching stopping points, in particular in the case of a rail vehicle intended for mass transport and approaching stopping points or stations, a start or continuation of travel from a halt, stoppage or shutdown of the vehicle is then (automatically) prevented.

SUMMARY

Accordingly, disclosed embodiments refine a double-leaf vehicle door device such that it has greater safety. Also, a vehicle with such a double-leaf vehicle door device is made available.

BRIEF DESCRIPTION OF THE FIGURES

Exemplary embodiments are illustrated in the drawings and explained in more detail in the description which follows. The drawings show.

DETAILED DESCRIPTION

Figure 1:
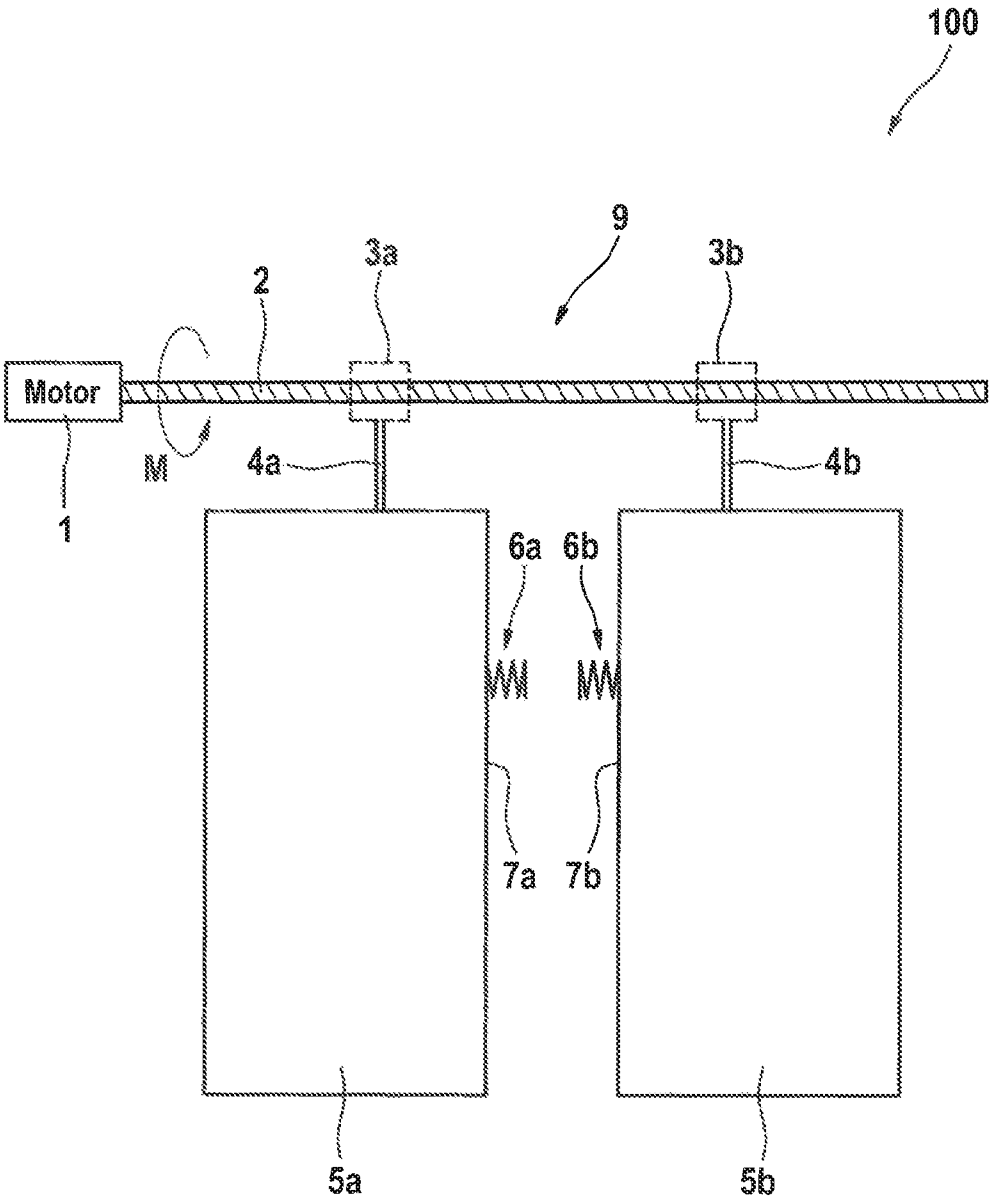
FIG. 1 a schematic side view of a double-leaf vehicle door device according to a disclosed embodiment.

In a double-leaf vehicle door device 100 shown in FIG. 1, with a first door leaf 5*a* and a second door leaf 5*b*, the two door leaves 5*a*, 5*b* are mechanically coupled together via a drive device 9 which contains a motor 1 and a spindle nut drive comprising a spindle 2 and a spindle nut 3. The closing process of the two door leaves 5*a*, 5*b* is controlled in synchrony because the two door leaves 5*a*, 5*b* are mechanically coupled together by the drive device, so that with a suitable design of mechanical coupling, the two door leaves 5*a*, 5*b* also reach their respective end positions in synchrony.

The closed position of the two door leaves 5*a*, 5*b* is here defined by the position itself and also by a defined compression of seals 6*a*, 6*b*, being a first seal 6*a* and a second seal 6*b*, which are arranged on opposite door edges 7*a*, 7*b* of the door leaves 5*a*, 5*b*. These seals 6*a*, 6*b*, which in FIG. 1 are shown for simplicity as springs, come into contact with one another shortly before the two doors 5*a*, 5*b* reach the closed positions. The deformation force of the first seal 6*a* of the first door leaf 5*a* thus also acts on the second seal 6*b* of the second door leaf 5*b* in the sense of the "action=reaction" principle, so that each door leaf 5*a*, 5*b* must be driven in order to apply the deformation force of its own seal 6*a* but also of seal 6*b* of the respective other door leaf 5*a*, 5*b* when the two door leaves 5*a*, 5*b* are brought into the closed position. Usually, the closing force or closing moment M is applied by the common motor 1. In the example of FIG. 1, the torque or closing moment M of the motor 1 is converted via the spindle nut drive into a linear closing force, which is then transmitted from the first spindle nut 3*a* and the second spindle nut 3*b* via connecting elements 4*a*, 4*b*, being a first connecting element 4*a* and a second connecting element 4*b*, to the respective door leaf 5*a*, 5*b*.

Figure 2:
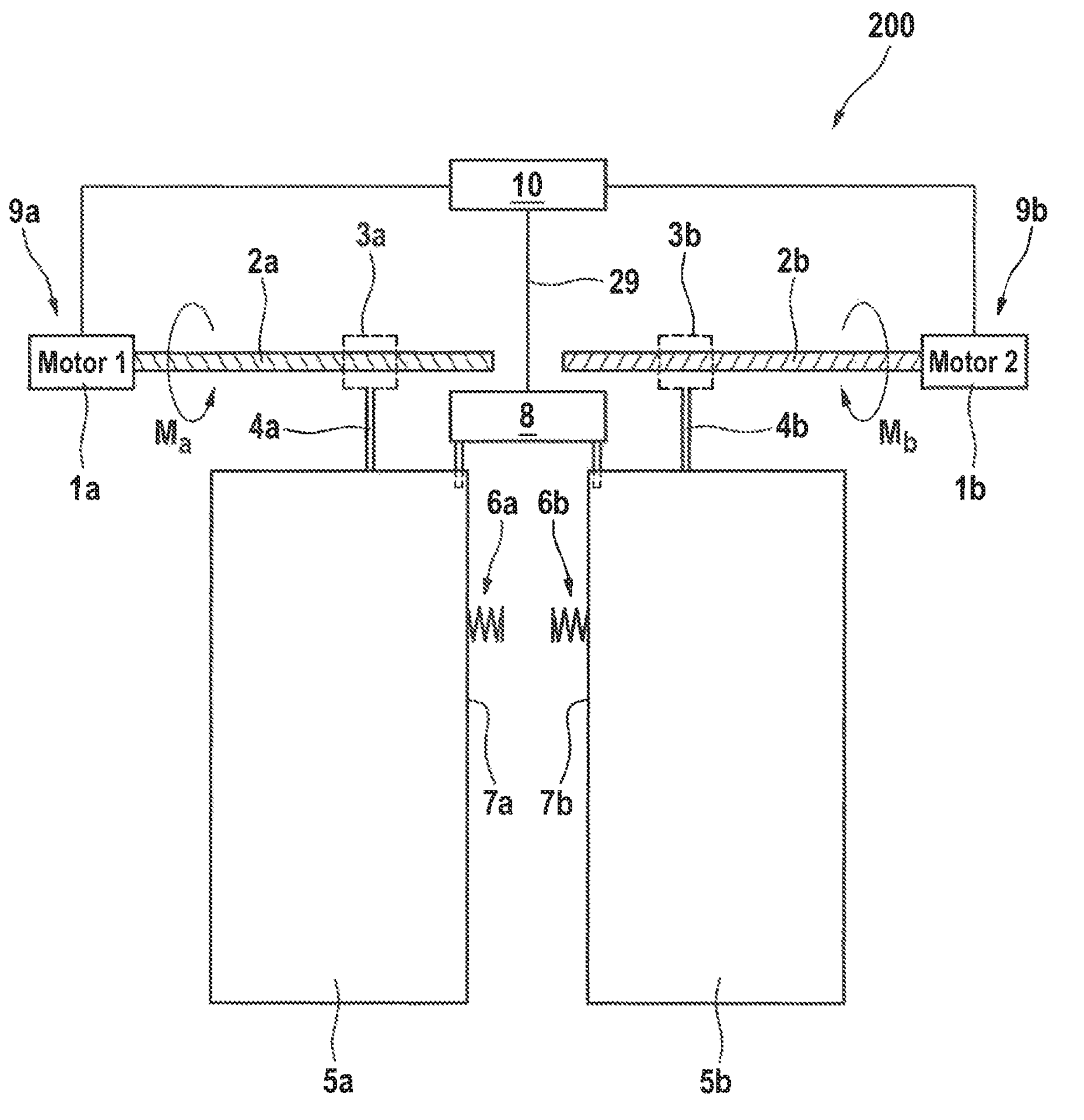
FIG. 2 a schematic side view of a double-leaf vehicle door device with a first door leaf and a second door leaf according to a second embodiment, which forms the basis for the disclosed embodiments, with a common locking device for locking the first door leaf and the second door leaf in the respective closed positions.

However, in the case of a vehicle door device 200 with a first drive device 9*a* for the first door leaf 5*a* and a second drive device 9*b* for the second door leaf 5*b*, without the two drive devices 9*a*, 9*b* or the door leaves 5*a*, 5*b* having a mechanical coupling (as forms the starting point of the disclosed embodiments and is shown as an example in FIG. 2), the deformation force of the two seals 6*a*, 6*b* of the two drive devices 9*a*, 9*b* must be applied in the same amount by a first motor 1*a* driving a first spindle 2*a* and also by a second motor 1*b* driving a second spindle 2*b*. The motors 1*a*, 1*b* are for example respective rotary motors which then also each drive a respective door leaf 5*a*, 5*b* via a respective spindle nut drive comprising spindle 2*a*, 2*b* and assigned spindle nut 3*a*, 3*b* and mechanical connecting elements 4*a*, 4*b*. Alternatively, the door leaves 5*a*, 5*b* may also be driven directly, i.e., without spindle nut drive, linearly by respective linear motors.

In order to hold the door leaves 5*a*, 5*b* of the vehicle door device 200 securely in their respective closed positions, a common lock device 8 is used, for example for both door leaves 5*a*, 5*b*. This lock device 8, also controlled by the controller 10, can only reliably lock the two door leaves 5*a*, 5*b* when both door leaves 5*a*, 5*b* are in their closed positions.

Furthermore, a signal device may be provided which is configured to generate a door leaf locking signal for signaling a successful complete locking of both door leaves 5*a*, 5*b* in their respective closed positions only when the first door leaf 5*a* is in its first closed position and locked and the second door leaf 5*b* is in its second closed position and locked, and otherwise does not generate a door leaf locking signal.

In relation to the design of a double-leaf vehicle door device in FIG. 2 with common locking of the two door leaves, it has been found that if a controller 10 of the two motors 1*a*, 1*b* does not succeed in bringing the two door leaves 5*a*, 5*b* into the closed position in synchrony, then a force must be exerted on the door leaf 5*a* or 5*b* which is already in the closed position so that this is not pushed out of its already reached closed position by the other door leaf 5*b* or 5*a*, which is not yet in its closed position but moving towards its closed position, because of the incipient contact of the two seals 6*a*, 6*b*.

Consequently, in the case of an asynchronous closing movement during the closing process of the two doors 5*a*, 5*b*, if a door leaf which is already in the closed position, e.g., the first door leaf 5*a*, is forced out of its closed position by contact of the first seal 6*a* with the second seal 6*b* of the second door leaf 5*b* which has not yet reached its closed position, the common locking device 8 cannot or cannot completely lock the two door leaves 5*a*, 5*b*.

Accordingly, the above-described door leaf locking signal also cannot be generated.

Disclosed embodiments provide a double-leaf vehicle door device comprising at least the following:

a) a first door leaf which can be moved by a first drive device between a first open position and a first closed position, in the form of respective end positions, and into any intermediate positions between the first open position and the first closed position, b) a second door leaf which can be moved by a second drive device between a second open position and a second closed position, in the form of respective end positions, and into any intermediate positions between the second open position and the second closed position, wherein c) a first movement of the first door leaf between the first open position and the first closed position, with respect to a second movement of the second door leaf between the second open position and the second closed position, takes place without mechanical coupling between the first door leaf and the second door leaf, and wherein d) the first door leaf carries a first elastic seal, and/or the second door leaf carries a second elastic seal, such that the first seal and the second door leaf or the second seal and the first door leaf or the first seal and the second seal contact one another force-transmissively when the first door leaf is in the first closed position and the second door leaf is in the second closed position, or when the first door leaf is already in the first closed position and the second door leaf stands at a point shortly before assuming the second closed position, or when the second door leaf is already in the second closed position and the first door leaf stands at a point shortly before assuming the first closed position, wherein e) a common locking device is provided which both locks the first door leaf in the first closed position when said door leaf is in the first closed position, and also locks the second door leaf in the second closed position when said door leaf is in the second closed position, wherein f) a pre-locking function is provided which is configured such that, of the first door leaf and the second door leaf, the one door leaf which reaches its closed position first is held in this closed position at least until the other door leaf has also reached its closed position, and the locking device is furthermore configured such that only then does it lock or is able to lock the first door leaf and the second door leaf.

The pre-locking function is therefore configured to hold in its closed position the one door leaf of the two door leaves which has reached its closed position first, while the other door leaf moves in the direction of its closed position but has not yet reached this.

A vehicle here means any type of vehicle, i.e., railgoing vehicles (rail vehicles) and non-railgoing vehicles, vehicles with drive machine and towed vehicles without drive machine, such as trailers or towed railcars in rail vehicle trains.

A common locking device for the first door leaf and the second door leaf means that only a single device or only a single mechanism is actuated for locking the first door leaf in the first closed position and the second door leaf in the second closed position, and not two separate devices or mechanisms each assigned to a respective door leaf.

A (pure) sliding door is, as is known, mounted so as to be able to slide only in or along a sliding direction between the closed position and the open position, while a pivot-sliding door first pivots in a pivot direction out of the closed position and then slides in the sliding direction until the open position is reached. Conversely, starting from the open position, a pivot-sliding door first slides along the sliding direction and then pivots in a pivot direction to assume the closed position. A pivot-sliding door therefore executes a combined pivot and sliding movement. Therefore, the first door leaf and the second door leaf may each be a pure sliding door leaf which executes a pure sliding movement, or a combined pivot-sliding door leaf which executes a combined pivot and sliding movement.

The optionally electrically actuated common locking device locks and/or unlocks the door leaves at least in the closed position; in particular, these are unlocked electrically and then locked using the locking device optionally solely by the movement of the two door leaves.

The pre-locking function according to the disclosed embodiments for the door leaf already in the closed position, or the holding of the one door leaf in its closed position, while the other door leaf has not yet reached its closed position, prevents the critical situation described initially in which the door leaf already in the closed position is pushed out of the already reached closed position by the door leaf which is not yet in the closed position but moving into its closed position, because of the incipient contact of the assigned seals. The pre-locking of the one door leaf causes a fixing of the one door leaf in its closed position and prevents this situation.

The pre-locking function may be integrated in the locking device or may also be configured as a stand-alone system.

Optionally, the first door leaf is driven by a first drive device and the second door leaf is driven by a second drive device, wherein the first drive device is formed separately from the second drive device. However, a common controller may be provided for the first drive device and the second drive device, so that the first door leaf assumes the first closed position and the second door leaf assumes the second closed position as far as possible in synchrony.

According to a refinement, a first door guide may be provided which moves the first door leaf relative to a door opening in a door frame, and a second guide device which moves the second door leaf relative to the door opening in the door frame.

The first door guide, the second door guide, the first drive device and the second drive device may, for example, be arranged on a railcar body or a body of the vehicle comprising the door opening in a door portal which can be closed and opened by the door leaves.

According to a further measure, the first door leaf may be a first sliding door leaf able to slide in a sliding direction and the second door leaf may be a second sliding door leaf able to slide in the sliding direction. Alternatively, the first door leaf may be a first pivot-sliding door leaf able to pivot in a pivot direction and slide in a sliding direction, and the second door leaf may be a second pivot-sliding door leaf able to pivot in a pivot direction and slide in a sliding direction.

Preferably, the locking device is configured such that the locking of the first door leaf in the first closed position and the locking of the second door leaf in the second closed position take place solely by a movement of the first door leaf into the first closed position and of the second door leaf into the second closed position. For unlocking the first door leaf and the second door leaf however, an actuator may be provided which is actuated e.g., electrically and/or pneumatically and must be actuated first, before the first door leaf and second door leaf can be unlocked and can then be moved by external force, in particular by the first and second drive devices.

Optionally, the pre-locking function is integrated in or forms a part of the locking device.

Here, the locking device may be configured such that the one door leaf of the first door leaf and the second door leaf which has reached its closed position first is held in its closed position solely by a movement of this one door leaf into its closed position.

This may be achieved for example in that the locking device comprises a rotatably mounted locking pawl which cooperates with a first rotatably mounted rotary latch and with a second rotatably mounted rotary latch, wherein a) the first rotary latch is preloaded by first rotary latch spring means in a first rotation direction, and the second rotary latch is preloaded by second rotary latch spring means in a second rotation direction, and
b) the locking pawl is preloaded by locking pawl spring means in a third rotation direction, and
c) the first rotary latch comprises a first rotary latch form-fit element and a first rotary latch locking element, and the second rotary latch comprises a second rotary latch form-fit element and a second rotary latch locking element, and
d) the first door leaf is connected to a first door leaf form-fit element, and the second door leaf is connected to a second door leaf form-fit element, and
e) the locking pawl comprises a first locking pawl locking element and a second locking pawl locking element, wherein
f) the first locking pawl locking element cooperates with the first rotary latch locking element, and the second locking pawl locking element cooperates with the second rotary latch locking element, and
g) the first door leaf form-fit element cooperates with the first rotary latch form-fit element, and the second door leaf form-fit element cooperates with the second rotary latch form-fit element.

In a starting position, i.e., when the two door leaves are each in a position deviating from the respective closed position, e.g., in the respective open position or in an intermediate position, optionally a clear gap is present between the second rotary latch locking element of the second rotary latch and the second locking pawl locking element. Then the second rotary latch and the locking pawl are not in contact.

Starting from the starting position, the first rotary latch, the second rotary latch and the locking pawl may furthermore be configured and rotatably mounted such that a) when, of the first door leaf and the second door leaf, the first door leaf forms the one door leaf which, of the first door leaf and the second door leaf, has reached its closed position first, and
b) when the first door leaf moves into the first closed position, the first door leaf form-fit element comes into contact with the first rotary latch form-fit element, and thereby the first rotary latch is twisted opposite the first rotation direction against the action of the first rotary latch spring means and thereby comes into contact with the locking pawl, which is then pivoted opposite the third rotation direction against the action of the locking pawl spring means, whereby firstly the first rotary latch form-fit element comes into form-fit engagement with the first door leaf form-fit element, and secondly the locking pawl comes out of contact with the first rotary latch and then, because of the action of the locking pawl spring means, is pivoted in the third rotation direction into a pre-locked position in which the first rotary latch locking element rests on the first locking pawl locking element and at least the locking pawl spring means and the first rotary latch spring means preload the locking pawl against the first rotary latch, whereby the first door leaf is held in the first closed position by the support of the first rotary latch locking element on the first locking pawl locking element but no in particular complete form-fit engagement is formed between the first rotary latch locking element and the first locking pawl locking element, and
c) when the second door leaf then moves into the second closed position, the second door leaf form-fit element comes into contact with the second rotary latch form-fit element and thereby the second rotary latch is twisted opposite the second rotation direction against the action of the second rotary latch spring means, whereby firstly the second rotary latch form-fit element comes into form-fit engagement with the second door leaf form-fit element, and secondly the second rotary latch comes into contact with the locking pawl and pivots this opposite the third rotation direction against the action of the locking pawl spring means, such that the support of the first rotary latch locking element on the first locking pawl locking element is maintained, but the locking pawl comes out of contact with the second rotary latch and then, because of the action of the locking pawl spring means, the locking pawl is pivoted in the third rotation direction into a locked position in which both a form-fit engagement is formed between the second locking pawl locking element and the second rotary latch locking element, and also a form-fit engagement is formed between the first rotary latch form-fit element and the first locking pawl locking element, wherein then d) in the locked position of the locking pawl, the respective form-fit engagement between the first rotary latch locking element and the first locking pawl locking element, and between the second locking pawl locking element and the second rotary latch locking element, is secured by the action of the first rotary latch spring means, the second rotary latch spring means and the third locking pawl spring means.

According to a refinement of this measure, it may be provided that a) the first rotary latch form-fit element is formed by a first groove, and the first door leaf form-fit element is formed by a first roller which can be brought into form-fit engagement with the first groove, and/or
b) the second rotary latch form-fit element is formed by a second groove, and the second door leaf form-fit element is formed by a second roller which can be brought into form-fit engagement with the second groove, and/or
c) the first rotary latch locking element is formed by a first protrusion, and the first locking pawl locking element is formed by a first recess which can be brought into form-fit engagement with the first protrusion, and/or
d) the second rotary latch locking element is formed by a second protrusion, and the second locking pawl locking element is formed by a second recess which can be brought into form-fit engagement with the second protrusion.

Alternatively, it may also be provided that a) the first rotary latch form-fit element is formed by a first roller, and the first door leaf form-fit element is formed by a first groove which can be brought into form-fit engagement with the first roller, and/or
b) the second rotary latch form-fit element is formed by a second roller, and the second door leaf form-fit element is formed by a second groove which can be brought into form-fit engagement with the second roller, and/or
c) the first rotary latch locking element is formed by a first recess, and the first locking pawl locking element is formed by a first protrusion which can be brought into form-fit engagement with the first recess, and/or
d) the second rotary latch locking element is formed by a second recess, and the second locking pawl locking element is formed by a second protrusion which can be brought into form-fit engagement with the second recess.

According to a refinement, a first sensor device may be provided which is configured such that it generates a door leaf locking signal when the first door leaf is in the first closed position and the second door leaf is in the second closed position, and otherwise does not generate a door leaf locking signal.

According to a development, the locking pawl may cooperate with the first sensor device such that the door leaf locking signal is generated when the locking pawl has assumed the locked position.

Here, the first sensor device may comprise at least one limit switch which cooperates with the locking pawl and generates the door leaf locking signal when the locking pawl is in the locked position.

Also, a second sensor device may be provided which is configured such that it is able to detect when the first door leaf is in the first closed position and the second door leaf is in the second closed position and then generates a door leaf closed position signal and otherwise does not generate a door leaf closed position signal.

In this case, the locking device may be configured such that only in response to the door leaf closed position signal does it lock the first door leaf in the first closed position and the second door leaf in the second closed position, and then generates a door leaf locking signal and otherwise does not generate a door leaf locking signal.

In general, the door leaf locking signal may constitute a signal allowing the start or continuation of travel of the vehicle. In other words, for example a controller checks whether or not the door leaf locking signal is present, wherein the controller is then configured to emit a signal allowing a start or continuation of travel of the vehicle when the door leaf locking signal is present, and not to emit a signal allowing a start or continuation of travel of the vehicle if no such door leaf locking signal is present. Thus a start or continuation of travel of the vehicle when the door leaves are not or not completely locked in the closed positions, is prevented. In particular, the signal allowing the start or continuation of travel of the vehicle may exert an influence on the braking and/or drive of the vehicle, without this influence being able to be influenced or overwritten by the driver of the vehicle.

According to a refinement, an unlocking actuator may be provided which sets the locking pawl in a rotation opposite the third direction of rotation such that in the locked position, the respective form-fit engagement between the first rotary latch locking element and the first locking pawl locking element and between the second rotary latch locking element and the second locking pawl locking element is released, and then the first rotary latch is pivoted in the first rotation direction into a first released position under the action of the first rotary latch spring means, and the second rotary latch is pivoted in the second rotation direction into a second released position under the action of the second rotary latch spring means, wherein in the first released position, the form-fit engagement between the first rotary latch form-fit element and the first door leaf form-fit element is released, and in the second released position, the form-fit engagement between the second rotary latch form-fit element and the second door leaf form-fit element is released. In this way, the first door leaf and the second door leaf may be moved by external force, in particular by the first and second drive devices, into the first and second opening positions.

Disclosed embodiments provide a vehicle, in particular a rail vehicle, with at least one double-leaf vehicle door device as described above.

FIG. 2 shows a schematic side view of a double-leaf vehicle door device 200, for example of a rail vehicle, with a first door leaf 5*a* and a second door leaf 5*b*, according to an embodiment which forms the basis of the disclosed embodiments. Here, the first door leaf 5*a* is for example a first sliding door leaf able to slide in a sliding direction, and the second door leaf 5*b* is a second sliding door leaf able to slide in the sliding direction. Accordingly, the vehicle door device 200 here optionally constitutes a vehicle sliding door device.

On their mutually facing door edges 7*a*, 7*b*, being a first door edge 7*a* and a second door edge 7*b*, the door leaves 5*a*, 5*b* carry seals 6*a*, 6*b*, being a first door seal 6*a* and a second door seal 6*b*. These seals 6*a*, 6*b*, which are shown in FIG. 2 for simplicity as springs, come into contact with one another shortly before the first door leaf 5*a* reaches a first closed position and the second door leaf 5*b* reaches a second closed position, and exert opposing spring forces because of the resulting compression of the seals 6*a*, 6*b*.

Furthermore, a first door guide is provided (not shown here) which guides the first door leaf 5*a* relative to a door opening in a door frame, and a second door guide (also not shown here) which guides the second door leaf 5*b* relative to the door opening in the door frame.

The vehicle door device 200 furthermore comprises first and second drive devices 9*a*, 9*b* without mechanical coupling of the two door leaves 5*a*, 5*b*, as forms the starting point of the disclosed embodiments. A first drive device 9*a* here has a first motor 1*a* driving a first spindle 2*a*, and a first spindle nut drive comprising the first spindle 2*a* and an assigned first spindle nut 3*a*. Similarly, a second drive device 9*b* comprises a second motor 1*b* driving a second spindle 2*b*, and a second spindle nut drive comprising the second spindle 2*b* and an assigned second spindle nut 3*b*. The motors 1*a*, 1*b* are for example rotary motors which then drive the assigned spindles 2*a*, 2*b*, in order, via the respective spindle nut drive, to screw the respective, rotationally fixedly held spindle nut 3*a*, 3*b* along the assigned spindle 2*a*, 2*b*, wherein mechanical connecting elements 4*a*, 4*b* each connect a door leaf 5*a*, 5*b* to the respective spindle nut 3*a*, 3*b*. Alternatively, the door leaves 5*a*, 5*b* may also be driven directly, i.e., without spindle nut drive, e.g., linearly by a respective linear motor.

The first door leaf 5*a* can therefore be moved by the first drive device 9*a* between a first open position and a first closed position, in the form of respective end positions, and into any intermediate positions between the first open position and the first closed position. Similarly, the second door leaf 5*b* can be driven by the second drive device 9*b* between a second open position and a second closed position, in the form of respective end positions, and into any intermediate positions between the second open position and the second closed position.

The first drive device 9*a* and the second drive device 9*b* are therefore here formed separately. The first drive device 9*a* and the second drive device 9*b* merely have a common controller 10 which controls the movement of the two door leaves 5*a*, 5*b*. A first movement of the first door leaf 5*a* between the first open position and the first closed position, with respect to a second movement of the second door leaf 5*b* between the second open position and the second closed position, here therefore takes place without mechanical coupling between the first door leaf 5*a* and the second door leaf 5*b*.

Shortly before the two door leaves 5*a*, 5*b* reach the first and second closed positions, or after reaching the closed positions, the deformation force of the two seals 6*a*, 6*b* must be applied to the same amount by the two drive devices 9*a*, 9*b*.

If the controller 10 of the two motors 1*a*, 1*b* does not succeed in bringing the two door leaves 5*a*, 5*b* into the first and second closed positions in synchrony, then a force must be applied to the first door leaf 5*a*, which is already for example in the first closed position, in order to ensure that it is not moved out of its already reached first closed position by the second door leaf 5*b* which is not yet in the second closed position but moving towards the second closed position, because of the incipient contact of the two seals 6*a*, 6*b*.

In order to lock the door leaves 5*a*, 5*b* of the vehicle door device 200 in their assumed closed position, or unlock these again, a common or single locking device 8 is used here for both door leaves 5, 5*b*. This can however only reliably lock the two door leaves 5*a*, 5*b* when both door leaves 5*a*, 5*b* are actually in their respective closed positions. The locking device 8 is here also controlled by the controller 10, which is optionally an electronic controller.

Therefore, a pre-locking function is provided which is configured such that, of the first door leaf 5*a* and the second door leaf 5*b*, the one door leaf which has reached its closed position first is held in this closed position at least until the other door leaf has reached its closed position. Furthermore, the locking device 8 is configured such that it locks or is able to lock the first door leaf 5*a* and the second door leaf 5*b* (completely) only when both door leaves 5*a*, 5*b* have each assumed their closed position.

In the exemplary embodiment described here, the pre-locking function is integrated in the locking device 8, as the following statements will show. The pre-locking function may however also be configured as a separate pre-locking function (stand-alone system).

The pre-locking function of the one door leaf which is already in the closed position, e.g., the first door leaf 5*a*, or the holding the first door leaf 5*a* in its closed position, while the second door leaf 5*b* has not yet reached its closed position, prevents the critical situation described above in which the first door leaf 5*a*, which is already in the closed position, is moved out of the already reached closed position by the second door leaf 5*b* which is not yet in the closed position but is moving into the closed position, because of the incipient contact of the assigned seals 6*a*, 6*b*. Then the pre-locking of the here e.g., first door leaf 5*a* causes a fixing of the first door leaf 5*a* in its closed position and prevents this being forced out of the first closed position by the approaching second door leaf 5*b*.

Figure 3:
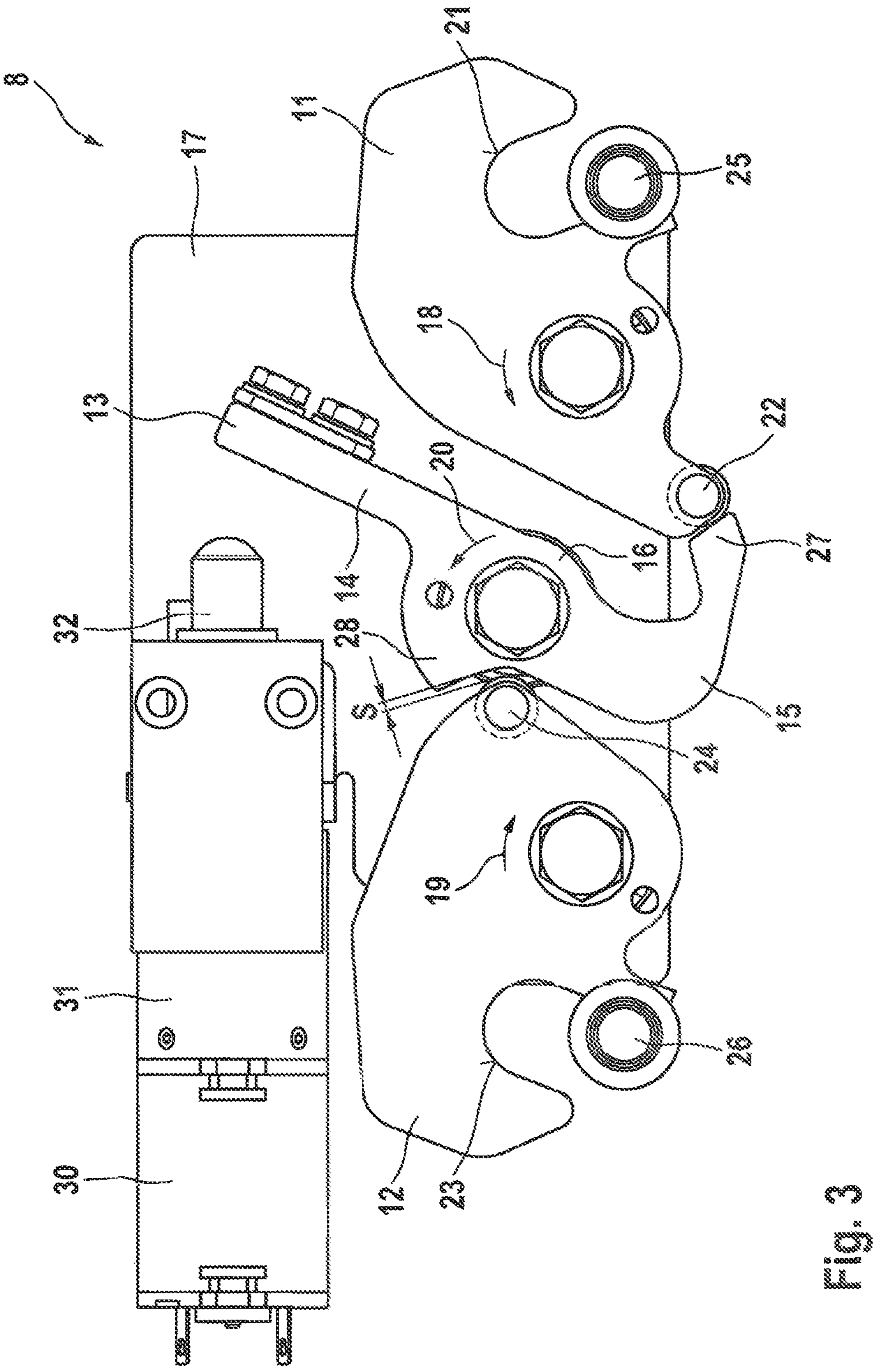
FIG. 3 a schematic side view of the locking device from FIG. 2 in a state in which the first door leaf is moved into the first closed position and the second door leaf into the second closed position.

FIG. 3 shows a schematic side view of the locking device 8 from FIG. 2, in a state in which the first door leaf 5*a* is moving into the first closed position and the second door leaf 5*b* is moving into the second closed position, but the two door leaves 5*a*, 5*b* have not yet reached the two closed positions. As FIG. 2 shows, the first door leaf 5*a* is optionally moved by the first drive device 9*a* and the second door leaf 5*b* by the second drive device 9*b*.

The locking device 8 optionally comprises a rotatably mounted locking pawl 13 which cooperates with a first rotatably mounted rotary latch 11 and with a second rotatably mounted rotary latch 12. The locking pawl 13 comprises for example two arms, a first arm 14 and a second arm 15, and a middle portion 16, via which it is rotatably mounted on a bearing plate 17 of the locking device 8.

The first rotary latch 11 is preloaded by first rotary latch spring means in a first rotation direction 18, and the second rotary latch 12 is preloaded by second rotary latch spring means in a second rotation direction 19, while the locking pawl 13 is preloaded by locking pawl spring means in a third rotation direction 20. In the exemplary embodiment, the first rotation direction 18 and the third rotation direction 20 are counterclockwise, and the second rotation direction 19 is clockwise.

The first rotary latch 11 and the second rotary latch 12 are also rotatably mounted on the bearing plate 17 of the locking device 8.

Furthermore, the first rotary latch 11 comprises a first rotary latch form-fit element 21 and a first rotary latch locking element 22, and the second rotary latch 12 comprises a second rotary latch form-fit element 23 and a second rotary latch locking element 24. Finally, the first door leaf 5*a* is connected to a first door leaf form-fit element 25, and the second door leaf 5*b* is connected to a second door leaf form-fit element 26.

The locking pawl 13 comprises a first locking pawl locking element 27 and a second locking pawl locking element 28, wherein the first locking pawl locking element 27 is formed for example at the end of the second arm 15 of the locking pawl 13 and cooperates with the first rotary latch locking element 22 of the first rotary latch 11. The second locking pawl locking element 28 is formed for example on the middle portion 16 of the locking pawl 13 and cooperates with the second rotary latch locking element 24 of the second rotary latch 12. Furthermore, the first door leaf form-fit element 25 cooperates with the first rotary latch form-fit element 21, and the second door leaf form-fit element 26 cooperates with the second rotary latch form-fit element 23.

The first rotary latch form-fit element 21 is here formed for example by a first groove, and the first door leaf form-fit element 25 is formed by a first roller which can be brought into form-fit engagement with the first groove. Furthermore, here for example the second rotary latch form-fit element 23 is formed by a second groove, and the second door leaf form-fit element 26 is formed by a second roller which can be brought into form-fit engagement with the second groove.

The first rotary latch locking element 22 may, as here, be formed by a first protrusion, and the first locking pawl locking element 27 by a first recess which can be brought into form-fit engagement with the first protrusion. Similarly, also the second rotary latch locking element 24 may be formed by a second protrusion, and the second locking pawl locking element 28 by a second recess which can be brought into form-fit engagement with the second protrusion.

It is assumed here that, in its movement into its first closed position, the first door leaf 5*a* has a slight lead over the second door leaf 5*b* in its movement into the second closed position. The first rotary latch 11, the second rotary latch 12 and the locking pawl 13 of the locking device 8 then cooperate with one another, as described below, during a closing movement of the two door leaves 5*a*, 5*b* implemented by the controller 10 using the two drive devices 9*a*, 9*b*.

In the starting position shown in FIG. 3, i.e., when the two door leaves 5*a*, 5*b* are each in a position deviating from the respective closed position, e.g., in the respective open position or an intermediate position, a clear gap s is present between the second rotary latch locking element 24 of the second rotary latch 12 and the second locking pawl locking element 28 or locking pawl 13. Then the second rotary latch 12 and the locking pawl 13 are not in contact.

If, as shown in FIG. 3, the first door leaf 5*a* moves into the first closed position, then the first door leaf form-fit element 25 comes into contact with the first rotary latch form-fit element 21. In this way, the first rotary latch 11 is twisted opposite the first rotation direction 18 (i.e., here clockwise) against the action of the first rotary latch spring means, and thereby comes into contact with the locking pawl 13 which, by this contact, is pivoted opposite the third rotation direction 20 (i.e., here clockwise) against the action of the locking pawl spring means.

Figure 4:
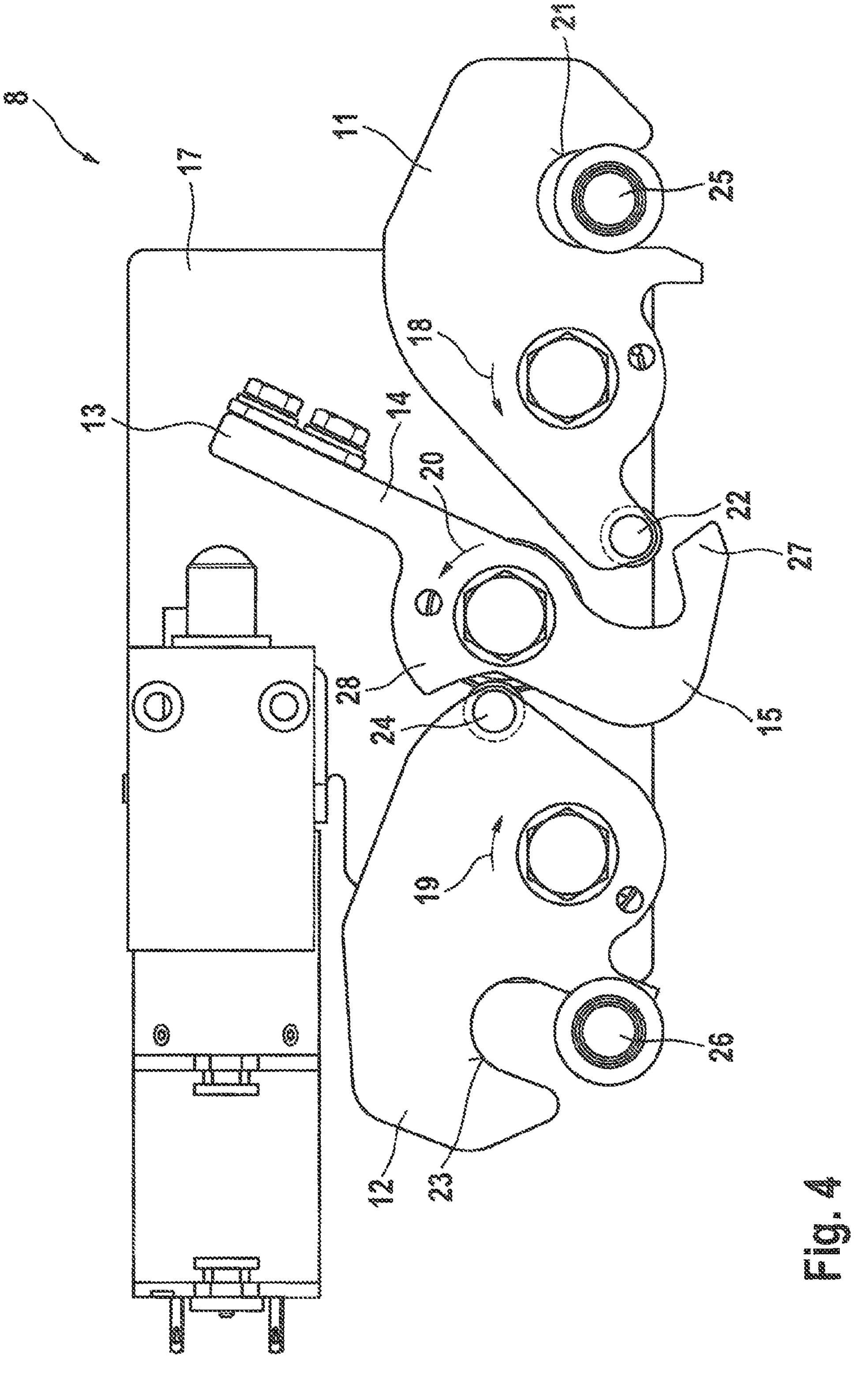
FIG. 4 a schematic side view of the locking device from FIG. 2 in a state in which the first door leaf has already reached the first closed position but the second door leaf is still being moved into the second closed position.

As a result, firstly the first rotary latch form-fit element 21 comes into form-fit engagement with the first door leaf form-fit element 25, and secondly the locking pawl 13 comes briefly or temporarily out of contact with the first rotary latch 11, as shown in FIG. 4.

Figure 5:
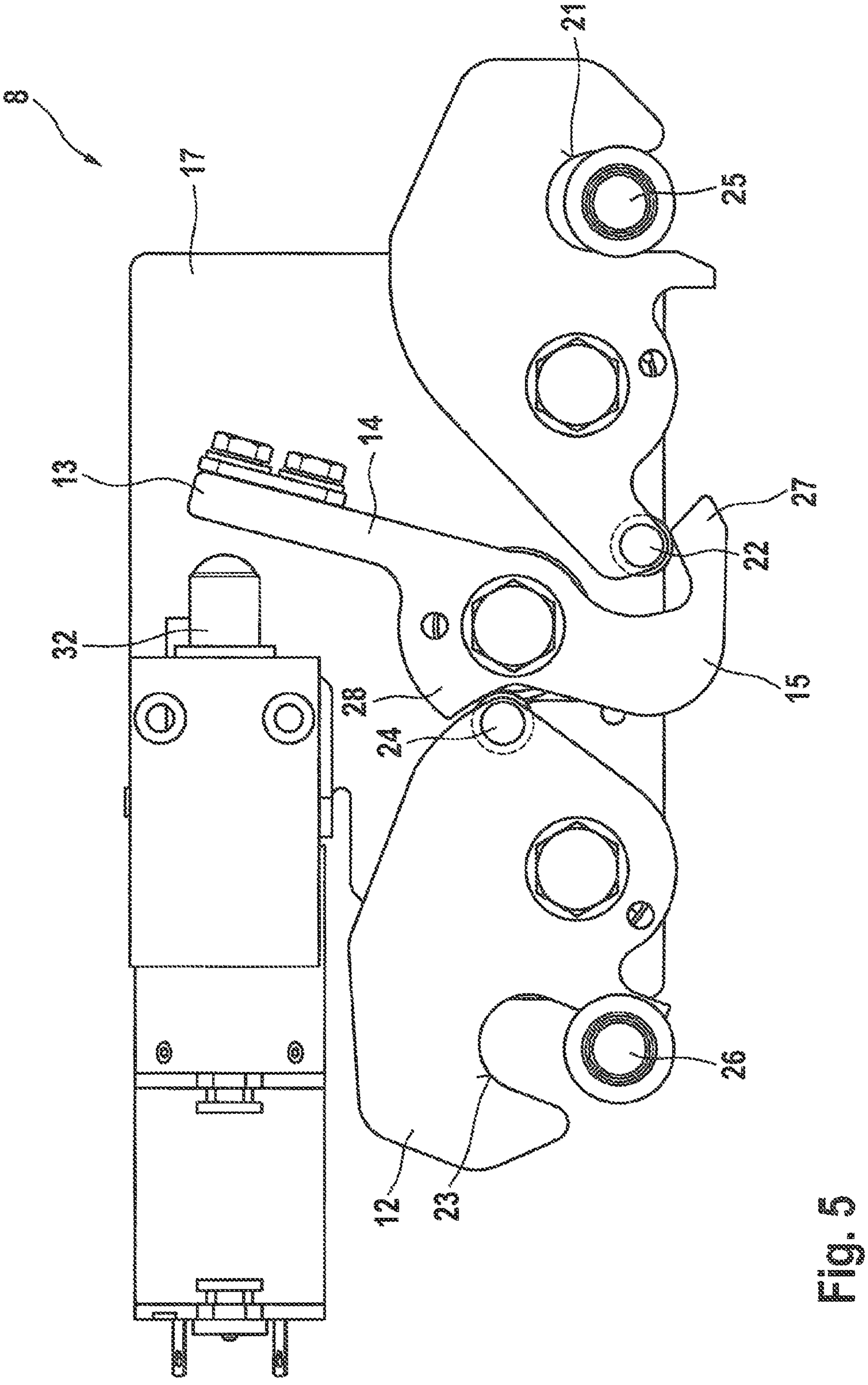
FIG. 5 a schematic side view of the locking device from FIG. 2 in a state in which the first door leaf is pre-locked in the first closed position but the second door leaf is still being moved into the second closed position.

The briefly released locking pawl 13, because of the action of the locking pawl spring means, pivots in the third rotation direction 20 (i.e., here counterclockwise) into a pre-locked position in which the first rotary latch locking element 22 rests on the first locking pawl locking element 27, and at least the locking pawl spring means and the first rotary latch spring means preload the locking pawl 13 against the first rotary latch 11 and ensure a holding of the locking pawl 13 in the pre-locked position, as shown in FIG. 5.

By means of the support of the first rotary latch locking element 22 on the first locking pawl locking element 27, shown in FIG. 5, the first door leaf 5*a* is indeed held in its first closed position, but no (complete) form-fit engagement is yet formed between the first rotary latch locking element 22 and the first locking pawl locking element 27.

Figure 6:
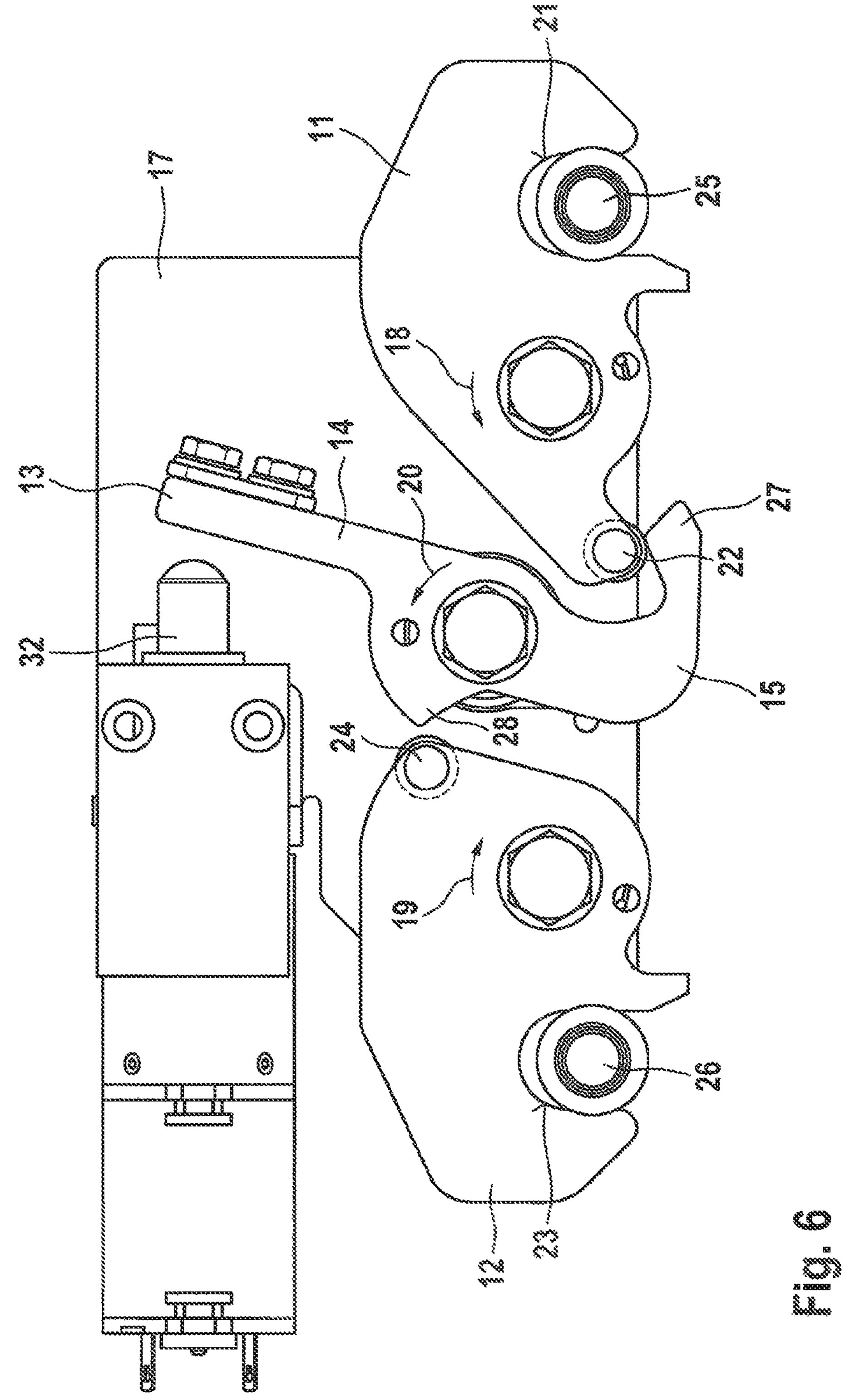
FIG. 6 a schematic side view of the locking device from FIG. 2 in a state in which the first door leaf is pre-locked in the first closed position and the second door leaf has reached the second closed position, FIG. 7 a schematic side view of the locking device from FIG. 2 in a state in which the first door leaf is locked in the first closed position and the second door leaf is locked in the second closed position.

If then, as shown in FIG. 6, the second door leaf 5*b* moves into its second closed position with a temporal offset relative to the first door leaf 5*a*, the second door leaf form-fit element 26 comes into contact with the second rotary latch form-fit element 23. The second rotary latch 12 is thereby twisted opposite the second rotation direction 19 (i.e., here counterclockwise) against the action of the second rotary latch spring means.

Thus, firstly, the second rotary latch form-fit element 23 comes into and maintains a form-fit engagement with the second door leaf form-fit element 26. Secondly, the second rotary latch 12 then comes into contact (for the first time) with the locking pawl 13 and pivots this opposite the third rotation direction 20 (i.e., here clockwise) against the action of the locking pawl spring means. This pivoting is however slight such that the support of the first rotary latch locking element 22 on the first locking pawl locking element 27 is retained, but the locking pawl 13 comes briefly out of contact with the second rotary latch 12, as shown in FIG. 6.

Figure 7:
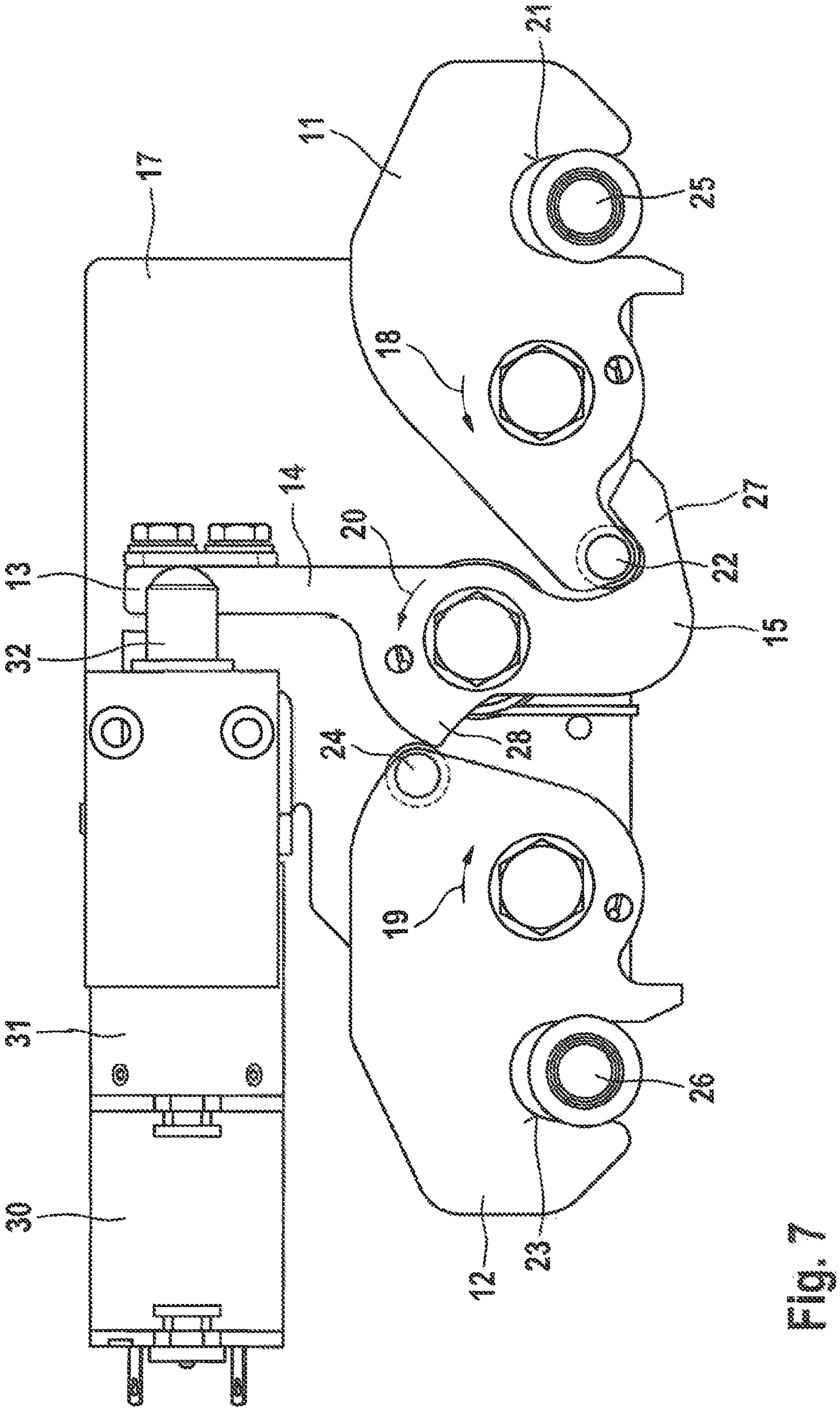

Because of the action of the locking pawl spring means, the locking pawl 13 is then pivoted in the third rotation direction 20 (i.e., here counterclockwise) into a locked position in which both a form-fit engagement is formed or created between the second locking pawl locking element 28 and the second rotary latch locking element 24, and also a complete form-fit engagement between the first rotary latch form-fit element 21 and the first locking pawl locking element 27. The locked position of the locking pawl 13 is shown in FIG. 7.

In the locked position of the locking pawl 13, the form-fit engagements between the first rotary latch locking element 22 and the first locking pawl locking element 27, between the second locking pawl locking element 28 and the second rotary latch locking element 24, between the first rotary latch form-fit element 21 and the first door leaf form-fit element 25, and between the second rotary latch form-fit element 23 and the second door leaf form-fit element 26, are then secured by the spring forces generated by the first rotary latch spring means, the second rotary latch spring means and the third locking pawl spring means, because these spring forces preload said elements against one another and thereby maintain the respective form fit.

Preferably, a first sensor device (not shown here) is provided which is configured to generate a door leaf locking signal when the first door leaf 5*a* is locked in the first closed position and the second door leaf 5*b* is locked in the second closed position. Otherwise, i.e., if the first door leaf 5*a* is not in the first closed position and/or the second door leaf 5*b* is not in the second closed position, no door leaf locking signal is generated.

In the exemplary embodiment shown here, the locking pawl 13 cooperates with the first sensor device such that, when the locking pawl 13 has assumed the locked position, the first sensor device generates the door leaf locking signal.

The first sensor device comprises for example a limit switch 32 which cooperates with the locking pawl 13 and generates the door leaf locking signal when the locking pawl 13 is in the locked position. The first sensor device or the limit switch 32 may be arranged for example such that it is actuated e.g., by the first arm 14 of the locking pawl 13 when this has assumed the locked position. In the view in FIGS. 3 to 7, the first sensor device 32 partially conceals an actuating element 33 of a release actuator 30. When the first sensor device 32 is loaded by the locking pawl 13, a force is exerted on the first sensor device 32 and/or a shift of an actuating element of the first sensor device 32 is produced, which can then be measured by the first sensor device 32.

The door leaf locking signal is here transmitted, for example via a control line 29, to the controller 10 where it is processed. The door leaf locking signal in particular constitutes a signal allowing a start or continuation of travel of the vehicle. For example, the controller 10 checks whether or not the door leaf locking signal is present, wherein the controller 10 is then configured to transmit, for example to a further controller of the vehicle, a signal allowing a start or continuation of travel of the vehicle when the door leaf locking signal is present, and not to emit a signal allowing a start or continuation of travel of the vehicle if no such door leaf locking signal is present.

Thus a start or continuation of travel of the vehicle is prevented if the door leaves 5*a*, 5*b* are not (completely) locked in their closed positions. In particular, the signal allowing the start or continuation of travel of the vehicle may have an influence on the braking and/or drive of the vehicle, without for example this influence being able to be influenced or overwritten by the driver of the vehicle.

Furthermore, in the exemplary embodiment described here, the unlocking actuator 30 is provided, for example in the form of an electric motor which is also attached to the bearing plate 17 and converts the rotary movement of its rotor via a gear mechanism 31 into a linear movement of the here e.g., peg-like actuating element 33, wherein the actuating element 33 here cooperates for example with the first arm 14 of the locking pawl 13. Depending on the direction of rotation of the rotor of the electric motor, therefore the actuating element 33 may extend into or retract from the unlocking actuator 30 or its gear mechanism 31. The locking pawl spring means here preload the first arm 14 of the locking pawl 13 in the third rotation direction 20 (here counterclockwise), i.e., here in the direction towards the actuating element 33. However, the actuating element 33 only makes contact with the locking pawl 13 for example when the locking pawl 13 is in the locked position shown in FIG. 7.

To unlock the two door leaves 5*a*, 5*b*, the unlocking actuator 30 (here the electric motor) is energized by the controller, whereby the actuating element 33 retracts from the unlocking actuator 30 and thereby the locking pawl 13 is set in rotation opposite the third rotation direction 20, i.e., here clockwise, so that the form-fit engagements between the first rotary latch locking element 22 and the first locking pawl locking element 27 and between the second rotary latch locking element 24 and the second locking pawl locking element 28 are released; then, because of the action of the first rotary latch spring means, the first rotary latch 11 is pivoted in the first rotation direction 18 (here counterclockwise) into a first released position, and because of the action of the second rotary latch spring means, the second rotary latch 12 is pivoted in the second rotation direction 19 (here clockwise) into a second released position.

In the first released position, the form-fit engagement between the first rotary latch form-fit element 21 and the first door leaf form-fit element 25 is released, and in the second released position, the form-fit engagement between the second rotary latch form-fit element 23 and the second door leaf form-fit element 26 is released. Then the first door leaf 5*a* and the second door leaf 5*b* can be moved into the first and second open positions by external force, in particular by the first and second drive devices 9*a*, 9*b*.

The exemplary embodiment described here concerns the situation in which, during closure of the door leaves 5*a*, 5*b*, the first door leaf 5*a* is slightly ahead of the second door leaf and thereby initially reaches its first closed position before the second door leaf 5*b* has reached its second closed position. However, the reverse order also leads to desired success with the disclosed embodiments, if the locking device 8 shown in FIG. 3 is rotated by 180° relative to the vertical.

The disclosed embodiments are furthermore not restricted to the pre-locking function being integrated in the locking device 8, as here, by suitable design and arrangement of the two rotary latches 11, 12 and the locking pawl 13. Rather, the pre-locking function may also be configured as a separate pre-locking device relative to the locking device 8, insofar as the former is configured solely to hold in the closed position the one door leaf 5*a* or 5*b* of the two door leaves 5*a*, 5*b* which has reached its closed position first, while the other door leaf 5*a* or 5*b* is still moving in the direction towards its closed position but has not yet reached this.

LIST OF REFERENCE SIGNS

1 Motor
1*a* First motor
1*b* Second motor
2 Spindle
2*a* First spindle
3*a* Second spindle
3 Spindle nut
3*a* First spindle nut
3*b* Second spindle nut
4*a* First connecting element
4*b* Second connecting element
5*a* First door leaf
5*b* Second door leaf
6*a* First seal
6*b* Second seal
7*a* First door edge
7*b* Second door edge
8 Locking device
9 Drive device
9*a* First drive device
9*b* Second drive device
10 Controller
11 First rotary latch
12 Second rotary latch
13 Locking pawl
14 First arm
15 Second arm
16 Middle portion
17 Bearing plate
18 First rotation direction
19 Second rotation direction
20 Third rotation direction
21 First rotary latch form-fit element
22 First rotary latch locking element
23 Second rotary latch form-fit element
24 Second rotary latch locking element
25 First door leaf form-fit element

26 Second door leaf form-fit element
27 First locking pawl locking element
28 Second locking pawl locking element
29 Control line
30 Unlocking actuator
31 Gear mechanism
32 First sensor device
33 Actuating element
100 Vehicle door device
200 Vehicle door device
S Gap

The invention claimed is:

1. A double-leaf vehicle door device comprising:

a first door leaf movable by a first drive device between a first open position and a first closed position as respective end positions, and into any intermediate positions between the first open position and the first closed position;

a second door leaf movable by a second drive device between a second open position and a second closed position as respective end positions, and into any intermediate positions between the second open position and the second closed position, wherein a first movement of the first door leaf between the first open position and the first closed position, with respect to a second movement of the second door leaf between the second open position and the second closed position, takes place without mechanical coupling between the first door leaf and the second door leaf, and wherein the first door leaf carries a first elastic seal, and/or the second door leaf carries a second elastic seal, configured such that the first seal and the second door leaf or the second seal and the first door leaf or the first seal and the second seal contact one another force-transmissively when the first door leaf is in the first closed position and the second door leaf is in the second closed position, or when the first door leaf is already in the first closed position and the second door leaf stands at a point shortly before assuming the second closed position, or when the second door leaf is already in the second closed position and the first door leaf stands at a point shortly before assuming the first closed position, wherein a common locking device is provided which both locks the first door leaf in the first closed position when said door leaf is in the first closed position, and also locks the second door leaf in the second closed position when said door leaf is in the second closed position, wherein the locking device comprises a rotatably mounted locking pawl which cooperates with a first rotatably mounted rotary latch and with a second rotatably mounted rotary latch, wherein a pre-locking function is provided which is configured such that when the first door leaf reaches its closed position first, it is held in this closed position in contact with a first rotatably mounted rotary latch of the common locking device, preloading the locking pawl against the first rotatably mounted rotary latch at least until the second door leaf has also reached its closed position, and the locking device is furthermore configured such that only when the first door leaf and the second door leaf are in their respective closed positions does the locking device assume a lock position to lock the first door leaf and the second door leaf.

2. The double-leaf vehicle door device of claim 1, wherein the first drive device is formed separately from the second drive device.

3. The double-leaf vehicle door device of claim 1, wherein a first door guide is provided which guides the first door leaf relative to a door opening in a door frame, and a second guide device which guides the second door leaf relative to the door opening in the door frame.

4. The double-leaf vehicle door device of claim 1, wherein the first door leaf is a first sliding door leaf able to slide in a sliding direction and the second door leaf is a second sliding door leaf able to slide in the sliding direction, or the first door leaf is a first pivot-sliding door leaf able to pivot in a pivot direction and slide in a sliding direction, and the second door leaf is a second pivot-sliding door leaf able to pivot in a pivot direction and slide in a sliding direction.

5. The double-leaf vehicle door device of claim 1, wherein the locking device is configured such that the locking of the first door leaf in the first closed position and the locking of the second door leaf in the second closed position take place solely by a movement of the first door leaf into the first closed position and of the second door leaf into the second closed position.

6. The double-leaf vehicle door device of claim 1, wherein the pre-locking function is integrated in or forms a part of the locking device.

7. The double-leaf vehicle door device of claim 1, wherein the locking device is configured such that the first door leaf and the second door leaf which has reached its closed position first is held in its closed position solely by a movement of this one door leaf into its closed position.

8. The double-leaf vehicle door device of claim 7, wherein the first rotary latch is preloaded by a first rotary latch spring in a first rotation direction, and the second rotary latch is preloaded by a second rotary latch spring in a second rotation direction, and the locking pawl is preloaded by a locking pawl spring in a third rotation direction, and the first rotary latch comprises a first rotary latch form-fit element and a first rotary latch locking element, and the second rotary latch comprises a second rotary latch form-fit element and a second rotary latch locking element, and the first door leaf is connected to a first door leaf form-fit element, and the second door leaf is connected to a second door leaf form-fit element, and the locking pawl comprises a first locking pawl locking element and a second locking pawl locking element, wherein the first locking pawl locking element cooperates with the first rotary latch locking element, and the second locking pawl locking element cooperates with the second rotary latch locking element, and the first door leaf form-fit element cooperates with the first rotary latch form-fit element, and the second door leaf form-fit element cooperates with the second rotary latch form-fit element.

9. The double-leaf vehicle door device of claim 8, wherein the first rotary latch, the second rotary latch and the locking pawl are configured and rotatably mounted such that when, of the first door leaf and the second door leaf, the first door leaf forms the one door leaf which, of the first door leaf and the second door leaf, has reached its closed position first, and when the first door leaf moves into the first closed position, the first door leaf form-fit element comes into contact with the first rotary latch form-fit element, and thereby the first rotary latch is twisted opposite the first rotation direction against the action of the first rotary latch spring and thereby comes into contact with the locking pawl, which is then pivoted opposite the third rotation direction against the action of the locking pawl spring, whereby firstly the first rotary latch form-fit element comes into form-fit engagement with the first door leaf form-fit element, and secondly the locking pawl comes out of contact with the first rotary latch and then, because of the action of the locking pawl spring, is pivoted in the third rotation direction into a pre-locked position in which the first rotary latch locking element rests on the first locking pawl locking element and at least the locking pawl spring and the first rotary latch spring preload the locking pawl against the first rotary latch, whereby the first door leaf is held in the first closed position by the support of the first rotary latch locking element on the first locking pawl locking element but no in particular complete form-fit engagement is formed between the first rotary latch locking element and the first locking pawl locking element, and when the second door leaf then moves into the second closed position, the second door leaf form-fit element comes into contact with the second rotary latch form-fit element and thereby the second rotary latch is twisted opposite the second rotation direction against the action of the second rotary latch spring, whereby firstly the second rotary latch form-fit element comes into form-fit engagement with the second door leaf form-fit element, and secondly the second rotary latch comes into contact with the locking pawl and pivots this opposite the third rotation direction against the action of the locking pawl spring, such that the support of the first rotary latch locking element on the first locking pawl locking element is maintained, but the locking pawl comes out of contact with the second rotary latch and then, because of the action of the locking pawl spring, the locking pawl is pivoted in the third rotation direction into a locked position in which both a form-fit engagement is formed between the second locking pawl locking element and the second rotary latch locking element, and also a form-fit engagement is formed between the first rotary latch form-fit element and the first locking pawl locking element, wherein in the locked position of the locking pawl, the respective form-fit engagement between the first rotary latch locking element and the first locking pawl locking element, and between the second locking pawl locking element and the second rotary latch locking element, is secured by the action of the first rotary latch spring, the second rotary latch spring and a third locking pawl spring.

10. The double-leaf vehicle door device of claim 9, wherein the first rotary latch form-fit element is formed by a first groove, and the first door leaf form-fit element is formed by a first roller which can be brought into form-fit engagement with the first groove, and/or the second rotary latch form-fit element is formed by a second groove, and the second door leaf form-fit element is formed by a second roller which can be brought into form-fit engagement with the second groove, and/or the first rotary latch locking element is formed by a first protrusion, and the first locking pawl locking element is formed by a first recess which can be brought into form-fit engagement with the first protrusion, and/or the second rotary latch locking element is formed by a second protrusion, and the second locking pawl locking element is formed by a second recess which can be brought into form-fit engagement with the second protrusion.

11. The double-leaf vehicle door device of claim 9, wherein a first sensor device is provided which is configured such that it generates a door leaf locking signal when the first door leaf is in the first closed position and the second door leaf is in the second closed position, and otherwise does not generate a door leaf locking signal.

12. The double-leaf vehicle door device of claim 11, wherein the locking pawl cooperates with the first sensor device such that the door leaf locking signal is generated when the locking pawl has reached the locked position.

13. The double-leaf vehicle door device of claim 12, wherein the first sensor device comprises at least one limit switch which cooperates with the locking pawl and generates the door leaf locking signal when the locking pawl is in the locked position.

14. The double-leaf vehicle door device claim 8, wherein an unlocking actuator is provided which sets the locking pawl in a rotation opposite the third direction of rotation such that in the locked position, the respective form-fit engagement between the first rotary latch locking element and the first locking pawl locking element and between the second rotary latch locking element and the second locking pawl locking element is released, and then the first rotary latch is pivoted in the first rotation direction into a first released position under the action of the first rotary latch spring, and the second rotary latch is pivoted in the second rotation direction into a second released position under the action of the second rotary latch spring, wherein in the first released position, the form-fit engagement between the first rotary latch form-fit element and the first door leaf form-fit element is released, and in the second released position, the form-fit engagement between the second rotary latch form-fit element and the second door leaf form-fit element is released.

15. The double-leaf vehicle door device of claim 1, wherein a second sensor device is provided which is configured to detect when the first door leaf is in the first closed position and the second door leaf is in the second closed position and then generate a door leaf closed position signal and otherwise does not generate a door leaf closed position signal.

16. The double-leaf vehicle door device of claim 15, wherein the locking device is configured to lock the first door leaf in the first closed position and the second door leaf in the second closed position only in response to the door leaf closed position signal, and then generates a door leaf locking signal and otherwise does not generate a door leaf locking signal.

17. The double-leaf vehicle door device of claim 16, wherein the door leaf locking signal is a signal allowing the start or continuation of travel of the vehicle.

18. A vehicle with at least one double-leaf vehicle door device as claimed in claim 1.

19. The vehicle of claim 18, wherein the vehicle is a rail vehicle.

20. The vehicle of claim 1, wherein the independent movement of the second of the second door leaf to the second closed position drives the common locking device to lock both the first and second door leaves.

* * * * *